(12) United States Patent
Fang et al.

(10) Patent No.: US 11,357,178 B2
(45) Date of Patent: Jun. 14, 2022

(54) **METHOD OF SCREENING TOBACCO GERMPLASM FOR RESISTANCE TO *ALTERNARIA ALTERNATA* BY RIPENING SEEDLING LEAVES**

(71) Applicant: Yunnan Academy of Tobacco Agricultural Sciences, Kunming (CN)

(72) Inventors: Dunhuang Fang, Kunming (CN); Bingguang Xiao, Kunming (CN); Zhijun Tong, Kunming (CN); Yahui Wang, Kunming (CN); Fangchan Jiao, Kunming (CN); Yihan Zhang, Kunming (CN); Xuejun Chen, Kunming (CN); Jianmin Zeng, Kunming (CN)

(73) Assignee: Yunnan Academy of Tobacco Agricultural Sciences, Kunming (CN)

( * ) Notice: Subject to any disclaimer, the term of this patent is extended or adjusted under 35 U.S.C. 154(b) by 0 days.

(21) Appl. No.: 17/200,885

(22) Filed: Mar. 14, 2021

(65) Prior Publication Data
US 2021/0329857 A1   Oct. 28, 2021

(30) Foreign Application Priority Data

Apr. 24, 2020 (CN) ............................ 202010334614

(51) Int. Cl.
*A01G 7/00* (2006.01)
*A01G 22/00* (2018.01)
(Continued)

(52) U.S. Cl.
CPC .............. *A01G 22/45* (2018.02); *A01G 7/06* (2013.01); *A01G 24/44* (2018.02); *A01G 31/02* (2013.01)

(58) Field of Classification Search
CPC ... A01G 7/06; A01G 7/00; A01G 1/00; A01G 31/02; A01G 22/40; A01G 22/44;
(Continued)

(56) References Cited

FOREIGN PATENT DOCUMENTS

| CN | 106358702 | * | 2/2017 | .............. A01G 7/06 |
| CN | 107821159 | * | 3/2018 | .............. A01H 1/04 |

OTHER PUBLICATIONS

"The art of growing plants for experimental purposes: a practical guide for the plant biologist," Poorteretal, Functional Plant Biology, 39(11) 821-838, https://doi.org/10.1071/FP12028, published Jun. 15, 2012, downloaded from publish.csiro.au/fp/fulltext/fp12028 on Jul. 30, 2021.*

(Continued)

*Primary Examiner* — Anne Marie Grunberg
(74) *Attorney, Agent, or Firm* — Bayramoglu Law Offices LLC

(57) ABSTRACT

The disclosure provides a method of screening tobacco germplasm for resistance to *Alternaria alternata* by ripening seedling leaves. The method includes ripening seedling leaves, spray inoculation, disease induction, and evaluation of disease resistance. Dense planting, fertilizer control, and potassium increment were used to forcibly ripening seedling leaves. A hospitable environment was simulated to induce disease in the ripened leaves. These treatments reduce differences in leaf maturity and avoid environmental changes. The technique of the disclosure provides greater accuracy and repeatability than the current technique of screening brown spot resistance, and offers the advantages of simple operation, reduced cost, space requirement, and labor intensity, high selection efficiency, and an accurate screening of tobacco phenotypes with resistance to brown spot, etc., used for large-scale screening of tobacco varieties with resistance to brown spot.

6 Claims, 8 Drawing Sheets

(51) Int. Cl.
  *A01G 31/00*  (2018.01)
  *C12N 3/00*  (2006.01)
  *C12Q 1/00*  (2006.01)
  *G01N 21/00*  (2006.01)
  *A01G 22/45*  (2018.01)
  *A01G 24/44*  (2018.01)
  *A01G 7/06*  (2006.01)
  *A01G 31/02*  (2006.01)

(58) Field of Classification Search
  CPC . A01G 22/45; C12N 3/00; C12Q 1/18; G01N 2333/37
  See application file for complete search history.

(56) References Cited

OTHER PUBLICATIONS

"Effects of Potassium on Plant Diseases," Better Crops/ vol. 82 (1998, No. 3), pp. 37-39, downloaded from https://ucanr.edu/sites/nm/files/76638.pdf on Jul. 31, 2021.*

"Evaulation of carrot resistance to alternaria leaf blight in controlled environments," Pawelec et al., Plant Pathology, (2006) 55, 68-72.*

"Comparative Genomics of Pathogens Causing Brown Spot Disease of Tobacco: Alternaria longipes and Alternaria alternata", Hou et al, PLoS One 2016: 11(5): e0155258, downloaded from ncbi.nlm.nih.gov/pmc/articles/PMC4861331/, pp. 1-21.*

"Some Aspects of Epidemiology of Alternaria Alternata Tobacco Pathotype," Slavov et al., Biotechnol. & Biotechnol. Eq. 18/2004/3, pp. 85-89, Apr. 2014, downloaded from https://www.researchgate.net/publication/267387654_Some_Aspects_of_Epidemiology_of_Alternaria_Alternata_Tobacco_Pathotype on Jul. 21, 2021.*

Francis and Gilman, Italian Botanist 8: 35-45, Dec. 4, 2019, Light intensity affects leaf morphology in a wild population of Adenostyles alliariae (Asteraceae), downloaded from https://italianbotanist.pensoft.net/article/39393/, abstract.*

Brad Christian, What is shade grown tobacco?, Jan. 25, 2019, downloaded from https://totalleafsupply.com/what-is-shade-grown-tobacco/.*

Wu et al, Low Light Alters the Photosynthesis Process in Cigar Tobacco via Modulation of the Chlorophyll Content, Chlorophyll Fluorescence, and Gene Expression, MDPI Agriculture, 2021, 11, 755. https://doi.org/10.3390/agriculture11080755, https://www.mdpi.*

Basha et al., Response of bid tobacco (*Nicotiana tabacum* L.) to foliar nutrition with nitrogen and potassium under rainfed conditions , Journal of Pharmacognosy and Phytochemistry, 2019: 8(1): 205-207, available online at www.phytojournal.com https://www.phytojournal.com/archives/2019/vol8issue1/PartD/7-6-440-683.p.*

* cited by examiner

METHOD OF SCREENING TOBACCO GERMPLASM FOR RESISTANCE TO *ALTERNARIA ALTERNATA* BY RIPENING SEEDLING LEAVES

CROSS-REFERENCE TO RELAYED APPLICATIONS

Pursuant to 35 U.S.C. § 119 and the Paris Convention Treaty, this application claims foreign priority to Chinese Patent Application No. 202010334614.9 filed Apr. 24, 2020, the contents of which, including any intervening amendments thereto, are incorporated herein by reference. Inquiries from the public to applicants or assignees concerning this document or the related applications should be directed to Matthias Scholl P C., Attn.: Dr. Matthias Scholl Esq., 245 First Street, 18th Floor, Cambridge, Mass. 02142.

BACKGROUND

The disclosure relates to the technical field of tobacco breeding in disease resistance and, more particularly, to a method of screening tobacco germplasm for resistance to *Alternaria alternata* by ripening seedling leaves.

Brown spot caused by *A. alternata* (tobacco pathotype) is a serious leaf disease of cultivated tobacco worldwide. *Alternaria alternata* is a necrotrophic fungus that infects mature leaves, especially leaves that are between physiological and technological ripeness. Breeding and utilization of disease-resistant varieties is the most economical and effective approach to control brown spot. Accurate and reliable resistance screening is helpful in accelerating the breeding process. Because the occurrence of brown spot is affected by climatic conditions, tobacco resistance, and pathogen pathogenicity, a simple and efficient technique is suggested to be important for detecting resistance to *A. alternata* in tobacco germplasm.

Currently, three types of representative techniques, namely, disease nursery, detached-leaf bioassay, and toxin test, are widely used for screening the resistance of brown spot in tobacco. Among them, the disease nursery is the final evaluation technique, while the others are auxiliary validation techniques or preliminary screening techniques.

The results of the detached-leaf bioassay, which used physiological mature detached leaves and simulated field environment, were reproducible, accurate, controllable, and improved the efficiency of screening tobacco germplasm for resistance to brown spot. This technique can be used for the preliminary screening of brown spot resistance on a large scale. In addition, the results of the disease nursery were verified. However, the detached leaf survival period is limited, which is usually 7 days. Moreover, this technique cannot accurately reflect the complete process of pathogen infection and extension.

The toxin test for screening resistance to brown spot was performed in growth chamber. It is quick and is less affected by the environment. Leaf and root, single cell, and protoplast can show obvious symptoms after 12 hours of treatment with the pathogenic toxin. Therefore, it is suitable for the screening of resistant mutation materials. However, finding suitable toxin concentrations and learning highly technical methods are required, which make this technique extremely difficult to execute and control. In addition, the toxin cannot infect and expand as the pathogen; this technique is only used as an auxiliary appraisal screening, preliminarily reflecting the disease-resistant properties of cultivars.

The disease nursery technique, a traditional technique for screening brown spot resistance, is recommended in the national standard of the People's Republic of China, GB/T 23224 Identification of cultivar resistance to tobacco disease, carried out in fields where the pathogen is known to occur, or by leaf inoculation. The resistant tobacco germplasm is obtained through multi-year screening in multiple field trials with this technique, reflecting the actual resistance level of varieties. However, the disease nursery technique, in which spore suspension is usually used to inoculate mature tobacco leaves in the field by spraying or hanging drop, is susceptible to the weather conditions and quantification of soil-borne *A. alternate*. Moreover, the results widely fluctuate from year to year, requiring to be repeated for many years. Field trials are highly labor-intensive, expensive, and time-consuming. Only one batch can be completed in the field during the planting season, and it takes up more space, restricting the scale of the technique.

Compared with the mature period, the seedling screening for brown spot resistance has the advantages of a shorter cycle and the need for a smaller space. The leaves at the seedling stage, which are applied for resistance detection according to the national standard, are immature. Moreover, the existing technique, which uses an artificial climate chamber to screen the resistance at the seedling stage, is divorced from the reality of the field, is rarely used in practice, and has poor practicality. Immature leaves have been confirmed to have high resistance to *A. alternata* and do not represent resistance in mature leaves, and the seedling age is relatively longer. The seedling age was over 90 days, and the leaf number was above 13 pieces, which is equivalent to the period from the rosette stage to the strongly growing stage.

In conclusion, it is necessary to develop a technique that is rapid and effective even at an early growth stage for the evaluation of brown spot resistance in tobacco leaves.

SUMMARY

The disclosure provides a method of screening tobacco germplasm for resistance to *A. alternata* by ripening seedling leaves, comprising: (1) ripening seedling leaves, (2) spray inoculation, (3) disease induction, and (4) evaluation of disease resistance.

(1) Ripening seedling leaves: intensively producing tobacco seedlings, transplanting the seedlings into a moist tray, and ripening seedling leaves while cultivating seedlings in the tray.

(2) Spray inoculation: inoculating a conidia suspension of *A. alternata* on the ripened leaves by spraying, thereby forming an artificial disease nursery in which *A. alternata* conidia are evenly distributed on the foliage of the seedling.

(3) Disease induction: simulating a hospitable environment to induce leaf spot disease, where the conidia of *A. alternate* germinate to infect the foliage of the seedling, and the seedling presents symptoms.

(4) Evaluation of disease resistance: investigating the disease for 14-21 days after inoculation; selecting multiple leaves to locate and observe the spreading process of the leaf spot and evaluating brown spot resistance when the susceptible, moderately resistant, and resistant varieties, as the control plants, show disease index (DI) in line with the indicators defined in the national standards for resistance identification of brown spot; and defining immune or highly resistant, resistant, and moderately resistant tobacco plants as resistant varieties.

The disclosure adopts the key technique in which seedling leaves are ripened, and the disease is induced to simulate the disease occurrence environment. The method for screening tobacco brown spot resistance has the following advantages:

1. Compared with previous methods for inducing disease at the seedling stage, ripening tobacco leaves, especially those susceptible to brown spot, are used in the disclosure. The results were easy to repeat.

2. *Alternaria alternata* conidia germinate and grow easily in the water film found on the surface of tobacco leaves. Dense planting, fertilizer control, and potassium increment are used to ripen the seedling leaves, which are beneficial to the infection of the necrotrophic fungus *A. alternata*. The ripened leaves were sprayed with a conidial suspension of *A. alternata*, which simulated wind and rain spread the pathogen. To promote the infection and expansion of *A. alternata* on the leaves, favorable conditions were simulated, such as appropriate temperature, high humidity, and low light conditions by air conditioning, ultrasonic/spray humidification, and shading or reducing the light time and light intensity, respectively. The artificial environment reduces the differences in leaf maturity and avoids changes in the external environmental conditions. The method of disclosure has greater accuracy and repeatability than the current methods for screening brown spot resistance.

3. The method in the disclosure offers the advantages of having a simple operation, reduced cost, space requirement, and labor intensity, high selection efficiency, and an accurate screening of tobacco phenotypes with resistance to brown spot, which can be used for the large-scale screening of tobacco varieties and breeding materials.

4. The disclosure usually takes three months from sowing to completing the evaluation, which shortens the screening time by ⅓-½ with respect to the entire growing season of traditional techniques in the field. Resistance screening can be carried out in batches with partial overlap and without interruption; thus, improving timeliness and expanding the scale of screening.

5. Compared with conventional mature leaves, the leaves after ripening in the seedling stage in the disclosure are smaller, which makes it easier to use a plant leaf image analyzer to calculate and correct the severity of leaf disease spot intelligently, improving the efficiency of correction detected by the naked eye.

DETAILED DESCRIPTION

Figure 1:
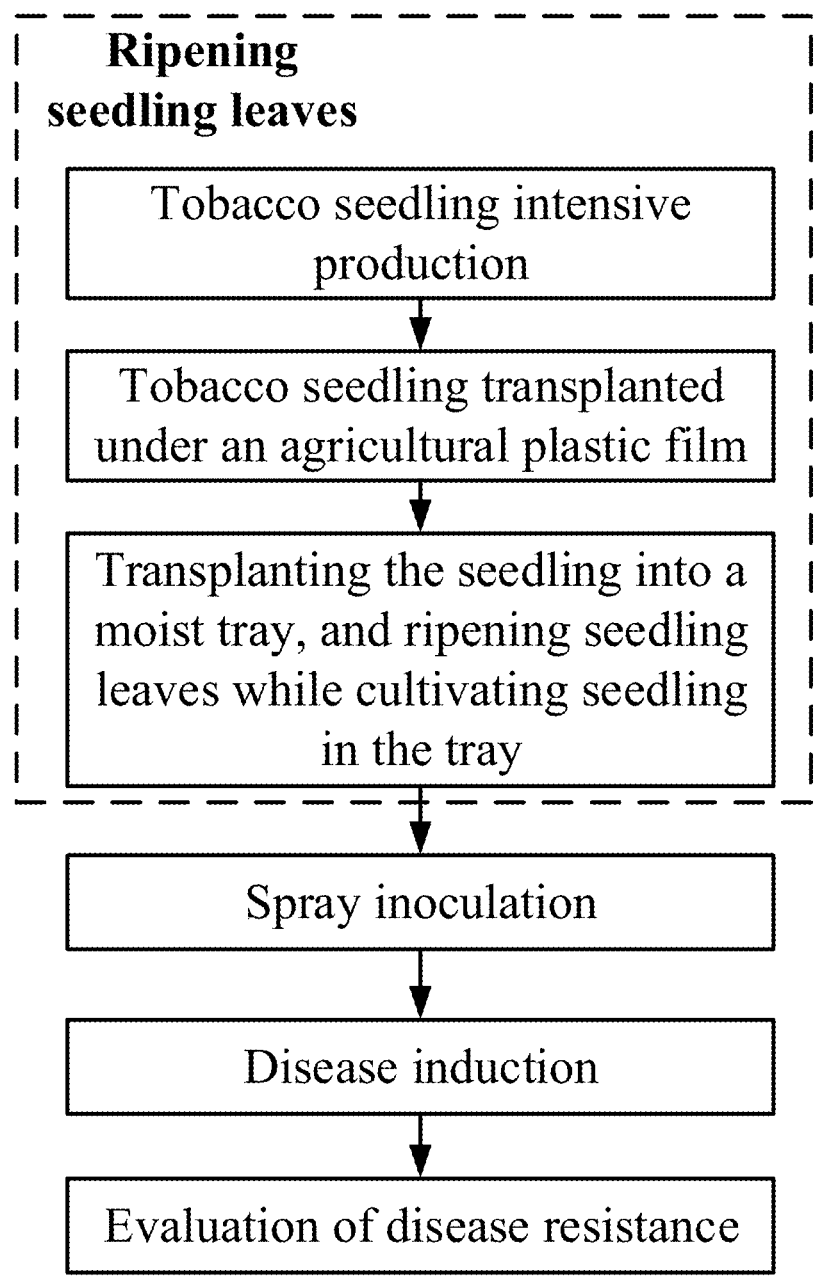
FIG. 1 shows a flow chart of the method used to screen tobacco for resistance to *A. alternata* by ripening seedling leaves.

To further illustrate the disclosure, embodiments detailing the method of screening tobacco germplasm for resistance to *A. alternata* through the ripening of seedling leaves are described below. It should be noted that the following embodiments are intended to describe and not limit disclosure.

The disclosure provides a method of screening tobacco germplasm for resistance to *A. alternata* by ripening seedling leaves, comprising the following steps: (1) ripening of seedling leaves, (2) spray inoculation, (3) disease induction, and (4) evaluation of disease resistance, as described next.

A) Ripening seedling leaves: Tobacco seedlings were intensively produced and transplanted into moist trays. The seedling leaves were ripened while the seedlings were cultivated in trays.

B) Spray inoculation: A conidial suspension of *A. alternata* was inoculated on the ripened leaves by spraying, forming an artificial disease nursery in which the conidia of *A. alternata* were evenly distributed on the foliage of the seedlings.

C) Disease induction: A hospitable environment was simulated to induce disease, where the conidia of *A. alternata* germinated to infect the foliage of the seedlings, and the seedlings presented symptoms.

D) Evaluation of disease resistance: The disease was investigated for 14-21 days after the inoculation. Multiple leaves were selected to observe the spreading of the leaf spot. When the susceptible, moderately resistant, and resistant varieties, as the control plants, show disease index (DI) in line with the indicators defined in the national standards for resistance identification of brown spot, the brown spot resistance was evaluated. Based on the national standard, immune or highly resistant, resistant, and moderately resistant tobacco plants were defined as resistant varieties.

In A), the intensive production seedling method was selected from the floating system, sand culture, and nursing on a moist tray.

In A), ripening the seedlings leaves was implemented as follows:

1) Intensive tobacco seedlings were transplanted into trays in a water pool having a water depth of ⅓ the height of the tray. A small plastic tunnel was built to protect the seedlings from sunlight for 1-2 days. The pool water was filled with a water-soluble potassium fertilizer solution containing 0.3%-0.5% agricultural potassium sulfate ($K_2SO_4$) or 0.3%-0.5% agricultural potassium dihydrogen phosphate ($KH_2PO_4$).

2) Seven days later, the same concentration of water-soluble potassium fertilizer solution was sprayed on the leaves, and no other fertilizer was applied. A small plastic tunnel was used to moistly cultivate the seedlings on the trays. After the seedlings absorbed nutrients from the substrate, new leaves grew and expanded. The seedling leaves would gradually thicken and turn yellow with the consumption of nutrients. The indicators used for the ripened seedling leaves were a viscous texture and light green color for the leaves and a white color for the main vein. The leaf chlorophyll soil plant analysis development (SPAD) values were 25-35. When the tobacco plant contained 3-5 effective ripened leaves, ripening was completed, sick and weak seedlings were eliminated, and residual leaves at the bottom and leaves with lesions were removed.

In B), the concentration of the conidium suspension of *A. alternata* was $10^4$ cfu/mL, obtained by diluting conidium mother liquor of *A. alternata*. The conidium diluent was an aqueous solution containing 1.00%-2.00% glucose or sucrose, 1.00%-2.00% glycerin, and 0.25%-0.50% Tween 80.

In C), disease induction included a pathogen infection stage and a disease development period. The simulation environment of the tobacco brown spot was as follows: during pathogen infection, the seedlings were cultivated in an artificial climate chamber moisturizing box or a small plastic tunnel, and the suitable environment was weak light, appropriate temperature, and ultrasonic water mist moisturizing for 3-5 days. During the disease development, simulating dew and guttation, ultrasound water atomization or micro-spraying was performed regularly at dawn and in the evening until fine water spraying on the foliage formed water drops which did not drip off the foliage. Thus, a humid environment in which disease spot could expand has been created. Moisturizing was completed when the disease was investigated 14-21 days after inoculation.

In C), the weak light in the artificial climate chamber moisturizing box was implemented by reducing the light intensity of the lamp by ⅓-½. The weak light in the small plastic tunnel was supplied by hanging shading net with shading efficiency of 30%-50%. The relative humidity at the pathogen infection stage was maintained above 85%, and the disease-induced phase of the temperature was controlled at 20-35° C.

In D), the resistance level of the brown spot was evaluated with the disease index. The resistance to *A. alternate* was divided into 5 levels according to the disease index range as follows: 0 is highly resistant or immune, 0.1-25.0 is resistant, 25.1-50.0 is moderately resistant, 50.1-75.0 is moderately susceptible, and 75.1-100.0 is susceptible.

In D), the resistant tobacco varieties were Jingyehuang and Beinhart 1000-1, the moderately resistant tobacco varieties were G28 and KRK26, the moderately susceptible tobacco variety was Honghua Dajinyuan, and the susceptible tobacco varieties were G140 and K326.

The ten tobacco varieties tested were Xiaohuangjin 1025, Gexin No. 3, K326, KRK26, G28, RBST, Beinhart 1000-1, Honghua Dajinyuan, G140, and Jingyehuang. The pathogen causing the brown spot of tobacco in the study was *A. alternata*.

EXAMPLE 1

A. Ripening Seedling Leaves

The tobacco seedlings transplanted under an agricultural plastic film were intensively produced with a 325-hole tray of the floating system. The seedlings were transplanted into a 32-hole tray with a height of 9 cm. The 32-hole tray was placed in a 3.0 cm deep water pool. Ripening of the seedling leaves was performed while the seedlings were cultivated on a moist tray. On the day of transplantation, the pool water contained 0.3% soluble agricultural $K_2SO_4$ solution. The seedlings were placed into a small plastic tunnel to shade the sun and moisturize for one day. After 7 days, the leaf surface was sprayed with the same water-soluble potassium fertilizer solution without other fertilizers. When the tobacco plant contained 3 effective ripened leaves, ripening was completed, sick and weak seedlings were eliminated, and residual leaves at the bottom and leaves with lesions were removed.

B. Spray inoculation

Figure 4:
FIG. 4 shows a schematic diagram of spray inoculation (by an electric knapsack sprayer).

The concentration of the conidium suspension of *A. alternata* was $10^4$ cfu/mL, obtained by diluting conidium mother liquor of *A. alternata*. The diluent was an aqueous solution containing 1.00% glucose or sucrose, 2.00% glycerin, and 0.25% Tween 80. The ripened leaves were inoculated by spraying conidial suspensions of *A. alternata* until the spraying water formed drops which did not roll off the leaves, thereby forming an artificial disease nursery in which the same concentration of pathogen was evenly distributed on the leaves (as shown in FIG. 4).

C. Disease Induction

Figure 5:
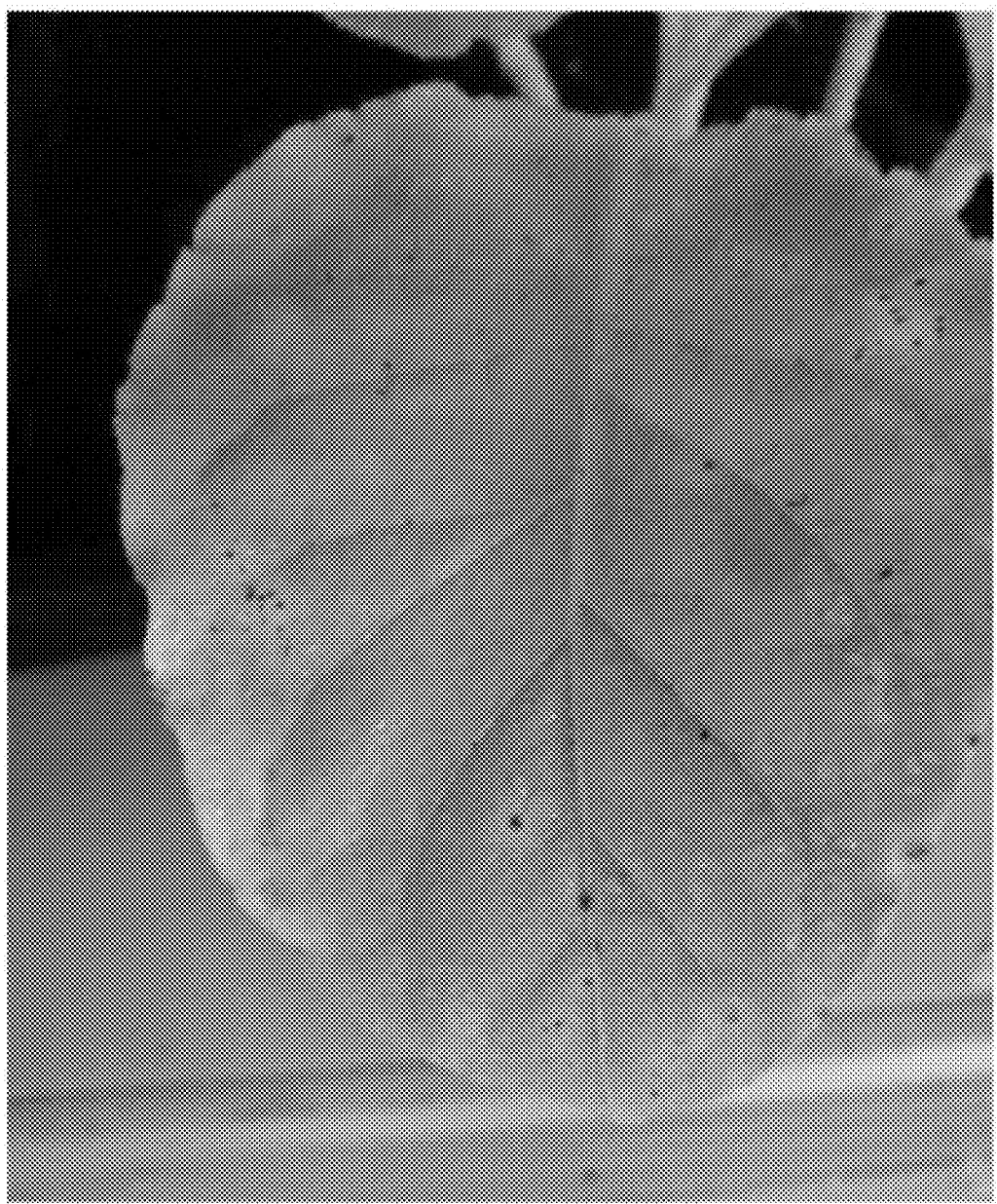
FIG. 5 shows the moisturizing effect of the ripened seedling leaves in a moisturizer box or a small plastic tunnel during induced disease. A thin water film forms locally on the leaves with water droplets.

The artificially disease nursery was moved into an artificial climate chamber moisturizing box. In order to induce pathogen infection, the temperature remained 20° C., 2 lamps were turned on (6 lamps were used normally) and ultrasonic water atomization had moisturized for 3 days. During the pathogen infection stage, the relative humidity was maintained at 85% (FIG. 5). After 3 days, simulated dew and guttation on the leaf surface to expand the disease spot, ultrasound water atomization was performed regularly at dawn and in the evening until fine water spraying on the foliage formed water drops which did not drip off the foliage. Stop ultrasound water atomization when the disease was investigated for 14 days after the inoculation.

D. Evaluation of Disease Resistance

During the expansion of lesions, moisturizing was carried out intermittently, and multiple leaves were selected to investigate the development of the leaf spot. When the susceptible, moderately resistant, and resistant varieties, as the control plants, show disease index (DI) in line with the indicators defined in the national standards for resistance identification of brown spot, the brown spot resistance was evaluated. Based on the national standard, immune or highly resistant, resistant, and moderately resistant tobacco plants are defined as resistant varieties.

EXAMPLE 2

A. Ripening Seedling Leaves

The tobacco seedlings transplanted under an agricultural plastic film were intensively produced with a 325-hole tray of the floating system. The seedlings were transplanted into a 32-hole tray with a height of 8 cm. The 32-hole tray was placed in a 2.7 cm deep water pool. Ripening of the seedling leaves was performed while the seedlings were cultivated on a moist tray. On the day of transplantation, the pool water contained 0.4% soluble agricultural $KH_2PO_4$ solution. The seedlings were placed into a small plastic tunnel to shade the sun and moisturize for one day. After 7 days, the leaf surface was sprayed with the same water-soluble potassium fertilizer solution without other fertilizers. When the tobacco plant contained 4 effective ripened leaves, ripening was completed, sick and weak seedlings were eliminated, and residual leaves at the bottom and leaves with lesions were removed.

B. Spray Inoculation

The concentration of the conidium suspension of *A. alternata* was $10^4$ cfu/mL, obtained by diluting conidium mother liquor of A. alternata. The diluent was an aqueous solution containing 2.00% sucrose, 1.00% glycerin, and 0.40% Tween 80. The ripened leaves were inoculated by spraying conidial suspensions of *A. alternata* until the spraying water formed drops which did not roll off the leaves, thereby forming an artificial disease nursery in which the same concentration of pathogen was evenly distributed on the leaves (as shown in FIG. 4).

C. Disease Induction

The artificially disease nursery was moved into an artificial climate chamber moisturizing box. In order to induce pathogen infection, the temperature remained 28° C., 3 lamps were turned on (6 lamps were used normally) and ultrasonic water atomization had moisturized for 4 days. During the pathogen infection stage, the relative humidity was maintained at 90% (FIG. 5). After 4 days, simulated dew and guttation on the leaf surface to expand the disease spot, ultrasound water atomization was performed regularly at dawn and in the evening until fine water spraying on the foliage formed water drops which did not drip off the foliage. Stop ultrasound water atomization when the disease was investigated for 17 days after the inoculation.

D. Evaluation of Disease Resistance

During the expansion of lesions, moisturizing was carried out intermittently, and multiple leaves were selected to investigate the development of the leaf spot. When the susceptible, moderately resistant, and resistant varieties, as the control plants, show disease index (DI) in line with the indicators defined in the national standards for resistance identification of brown spot, the brown spot resistance was evaluated. Based on the national standard, immune or highly resistant, resistant, and moderately resistant tobacco plants are defined as resistant varieties.

EXAMPLE 3

A. Ripening Seedling Leaves

The tobacco seedlings transplanted under an agricultural plastic film were intensively produced with a 325-hole tray of the floating system. The seedlings were transplanted into a 32-hole tray with a height of 10 cm. The 32-hole tray was placed in a 3.3 cm deep water pool. Ripening of the seedling leaves was performed while the seedlings were cultivated on a moist tray. On the day of transplantation, the pool water contained 0.5% soluble agricultural $KH_2PO_4$ solution. The seedlings were placed into a small plastic tunnel to shade the sun and moisturize for 2 days. After 7 days, the leaf surface was sprayed with the same water-soluble potassium fertilizer solution without other fertilizers. When the tobacco plant contained 5 effective ripened leaves, ripening was completed, sick and weak seedlings were eliminated, and residual leaves at the bottom and leaves with lesions were removed.

B. Spray Inoculation

The concentration of the conidium suspension of *A. alternata* was $10^4$ cfu/mL, obtained by diluting conidium mother liquor of *A. alternata*. The diluent was an aqueous solution containing 2.00% sucrose, 2.00% glycerin, and 0.50% Tween 80. The ripened leaves were inoculated by spraying conidial suspensions of A. alternata until the spraying water formed drops which did not roll off the leaves, thereby forming an artificial disease nursery in which the same concentration of pathogen was evenly distributed on the leaves (as shown in FIG. 4).

C. Disease Induction

The artificially disease nursery was moved into an artificial climate chamber moisturizing box. In order to induce pathogen infection, the temperature remained 35° C., 3 lamps were turned on (6 lamps were used normally) and ultrasonic water atomization had moisturized for 5 days. During the pathogen infection stage, the relative humidity was maintained at 95% (FIG. 5). After 5 days, simulated dew and guttation on the leaf surface to expand the disease spot, ultrasound water atomization was performed regularly at dawn and in the evening until fine water spraying on the foliage formed water drops which did not drip off the foliage. Stop ultrasound water atomization the disease was investigated for 21 days after the inoculation.

D. Evaluation of Disease Resistance

During the expansion of lesions, moisturizing was carried out intermittently, and multiple leaves were selected to investigate the development of the leaf spot. When the susceptible, moderately resistant, and resistant varieties, as the control plants, show disease index (DI) in line with the indicators defined in the national standards for resistance identification of brown spot, the brown spot resistance was evaluated. Based on the national standard, immune or highly resistant, resistant, and moderately resistant tobacco plants are defined as resistant varieties.

EXAMPLE 4

A. Ripening Seedling Leaves

The tobacco seedlings transplanted under an agricultural plastic film were intensively produced with a 325-hole tray of the floating system. The seedlings were transplanted into a 32-hole tray with a height of 12 cm. The 32-hole tray was placed in a 4.0 cm deep water pool. Ripening of the seedling leaves was performed while the seedlings were cultivated on a moist tray. On the day of transplantation, the pool water contained 0.5% soluble agricultural $K_2SO_4$ solution. The seedlings were placed into a small plastic tunnel to shade the sun and moisturize for one day. After 6 days, the leaf surface was sprayed with the same water-soluble potassium fertilizer solution without other fertilizers. When the tobacco plant contained 4 effective ripened leaves, ripening was completed, sick and weak seedlings were eliminated, and residual leaves at the bottom and leaves with lesions were removed.

B. Spray Inoculation

The concentration of the conidium suspension of *A. alternata* was $10^4$ cfu/mL, obtained by diluting conidium mother liquor of *A. alternata*. The diluent was an aqueous solution containing 1.50% sucrose, 2.00% glycerin, and 0.40% Tween 80. The ripened leaves were inoculated by spraying conidial suspensions of A. alternata until the spraying water formed drops which did not roll off the leaves, thereby forming an artificial disease nursery in which the same concentration of pathogen was evenly distributed on the leaves (as shown in FIG. 4).

C. Disease Induction

The artificially disease nursery was moved into an artificial climate chamber moisturizing box. In order to induce pathogen infection, the temperature remained 30° C., 2 lamps were turned on (6 lamps were used normally) and ultrasonic water atomization had moisturized for 5 days. During the pathogen infection stage, the relative humidity was maintained at 93% (FIG. 5). After 5 days, simulated dew and guttation on the leaf surface to expand the disease spot, ultrasound water atomization was performed regularly at dawn and in the evening until fine water spraying on the foliage formed water drops which did not drip off the foliage. Stop ultrasound water atomization the disease was investigated for 18 days after the inoculation.

D. Evaluation of Disease Resistance

During the expansion of lesions, moisturizing was carried out intermittently, and multiple leaves were selected to investigate the development of the leaf spot. When the susceptible, moderately resistant, and resistant varieties, as the control plants, show disease index (DI) in line with the indicators defined in the national standards for resistance identification of brown spot, the brown spot resistance was evaluated. Based on the national standard, immune or highly resistant, resistant, and moderately resistant tobacco plants are defined as resistant varieties.

EXAMPLE 5

A. Ripening Seedling Leaves

The tobacco seedlings transplanted under an agricultural plastic film were intensively produced with a 325-hole tray of the floating system. The seedlings were transplanted into a 32-hole tray with a height of 10 cm. The 32-hole tray was placed in a 3.3 cm deep water pool. Ripening of the seedling leaves was performed while the seedlings were cultivated on a moist tray. On the day of transplantation, the pool water contained 0.4% soluble agricultural $K_2SO_4$ solution. The seedlings were placed into a small plastic tunnel to shade the sun and moisturize for one day. After 6 days, the leaf surface was sprayed with the same water-soluble potassium fertilizer solution without other fertilizers. When the tobacco plant contained 5 effective ripening leaves, ripening was completed, sick and weak seedlings were eliminated, and residual leaves at the bottom and leaves with lesions were removed.

B. Spray Inoculation

The concentration of the conidium suspension of *A. alternata* was $10^4$ cfu/mL, obtained by diluting conidium mother liquor of *A. alternata*. The diluent was an aqueous solution containing 1.00% sucrose, 1.00% glycerin, and 0.50% Tween 80. The ripened leaves were inoculated by spraying conidial suspensions of *A. alternata* until the spraying water formed drops which did not roll off the leaves, thereby forming an artificial disease nursery in which the same concentration of pathogen was evenly distributed on the leaves (as shown in FIG. 4).

C. Disease Induction

The artificially disease nursery was moved into an artificial climate chamber moisturizing box. In order to induce pathogen infection, the temperature remained 35° C., 3 lamps were turned on (6 lamps were used normally) and ultrasonic water atomization had moisturized for 3 days. During the pathogen infection stage, the relative humidity was maintained at 88% (FIG. 5). After 3 days, simulated dew and guttation on the leaf surface to expand the disease spot, ultrasound water atomization was performed regularly at dawn and in the evening until fine water spraying on the foliage formed water drops which did not drip off the foliage. Stop ultrasound water atomization the disease was investigated for 14 days after the inoculation.

D. Evaluation of Disease Resistance

During the expansion of lesions, moisturizing was carried out intermittently, and multiple leaves were selected to investigate the development of the leaf spot. When the susceptible, moderately resistant, and resistant varieties, as the control plants, show disease index (DI) in line with the indicators defined in the national standards for resistance identification of brown spot, the brown spot resistance was evaluated. Based on the national standard, immune or highly resistant, resistant, and moderately resistant tobacco plants are defined as resistant varieties.

Evaluate the method for screening brown spot resistance in Example 1

1. Evaluation of the Effect of Forcedly Ripened Seedling Leaves

Figure 2:
FIG. 2 is a schematic diagram of intensive tobacco seedling production in a 325-hole floating tray, which was cultivated under an agricultural plastic film.
Figure 3:
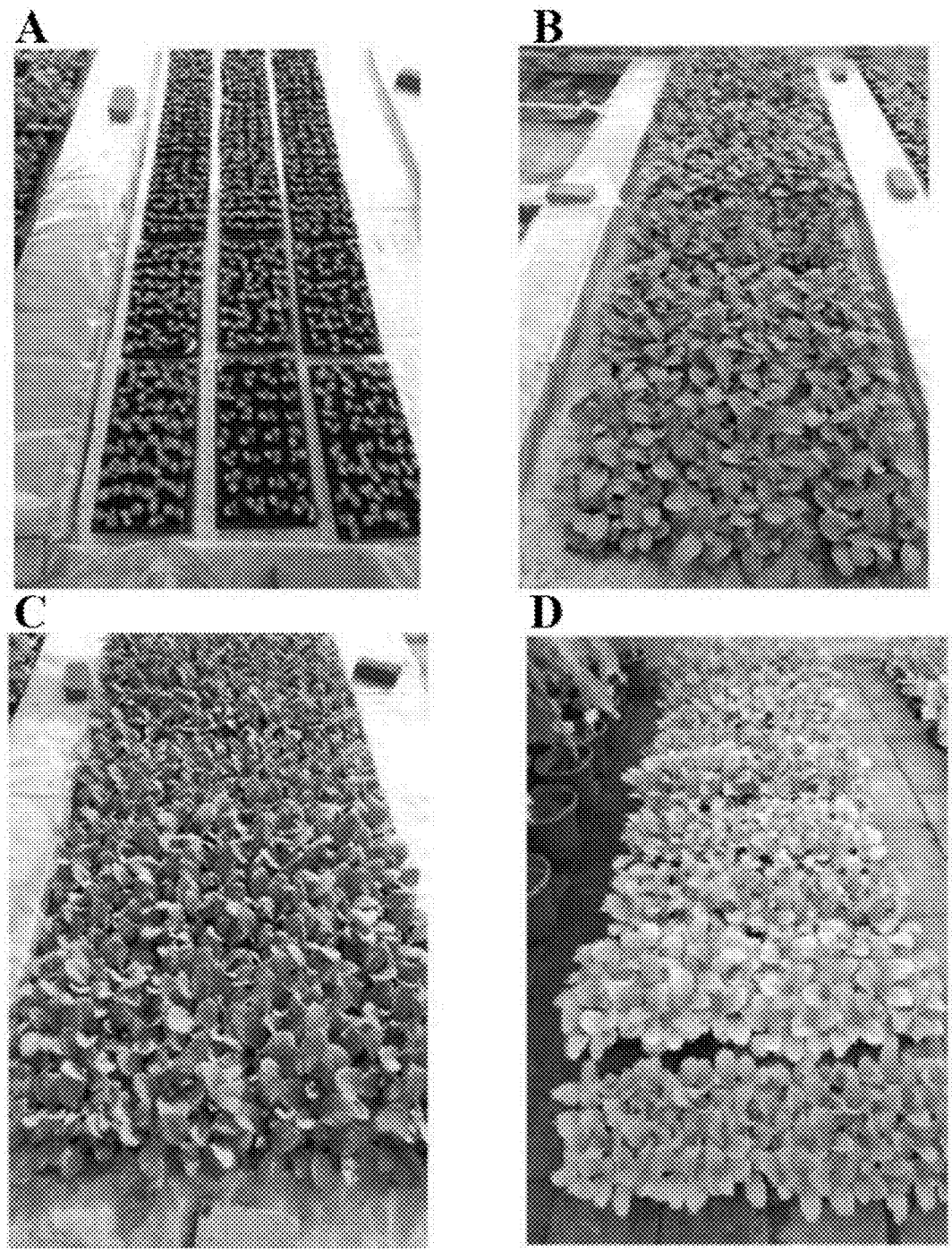
FIG. 3 shows the changes in the seedling leaves in a 32-hole moistening tray during ripening. Photos A, B, C, and D show the growth changes of seedlings at weekly intervals. With the passage of time, the number of leaves per seedling gradually increases, the leaf area becomes larger, and the leaf's color turns from green to yellow.

Seedlings under the agricultural plastic film (as shown in FIG. 2) were transplanted in a moist tray for cultivation. New leaves of seedlings sprouted and unfolded. With the consumption of nutrients, the leaves gradually thickened and turned yellow due to the lack of fertilizer (as shown in FIG. 3). The appropriate indicators for the ripened seedling leaves were a viscous texture and light green color for the leaves and a white color for the main vein. Each variety was measured for the chlorophyll SPAD values with a chlorophyll meter, repeated 3 times, with 5 plants for each variety treated as a repetition and measuring 3 leaves from the bottom to the top of each plant. Each leaf was measured at 2 points on the middle part of the leaf and at 1 point each on the leaf base and tip. The average value for each repetition was calculated. The results indicated that the chlorophyll SPAD value ranged from 25 to 35, and the difference between the replicates and the 3 consecutive batches was not significant (FIG. 1). These results showed that the quality of the ripened leaves at the seedling stage, which could be observed by the naked eye and quantified by a portable instrument, was stable, reliable, and repeatable. When each tobacco seedling had 3-5 ripened leaves, ripening was completed. The sick and weak seedlings were eliminated, and the overripe residual leaves at the bottom and leaves with lesions were removed.

TABLE 1

SPAD values of forcedly ripened leaves from different tobacco varieties

| Tobacco varieties | Repetition | | | Average SPAD value | Standard deviation |
| --- | --- | --- | --- | --- | --- |
| | I | II | III | | |
| Beinhart 1000-1 | 26.24 | 31.22 | 27.44 | 28.30 | 2.60 |
| Xiaohuangjin1025 | 26.34 | 25.85 | 25.10 | 25.76 | 0.62 |
| Jingyehuang | 27.41 | 25.34 | 26.60 | 26.45 | 1.04 |
| G140 | 28.88 | 29.68 | 28.48 | 29.01 | 0.61 |
| KRK26 | 25.47 | 29.47 | 26.15 | 27.03 | 2.14 |
| RBST | 25.98 | 25.07 | 25.37 | 25.47 | 0.46 |
| Gexin No. 3 | 28.98 | 31.19 | 31.28 | 30.48 | 1.30 |
| Honghua Dajinyuan | 27.53 | 27.50 | 27.56 | 27.53 | 0.03 |
| G28 | 27.82 | 28.70 | 29.50 | 28.67 | 0.84 |
| K326 | 27.44 | 28.38 | 27.28 | 27.70 | 0.60 |

2. Evaluation of Resistance to Brown Spot By Forcedly Ripened Seedling Leaves

Figure 6:
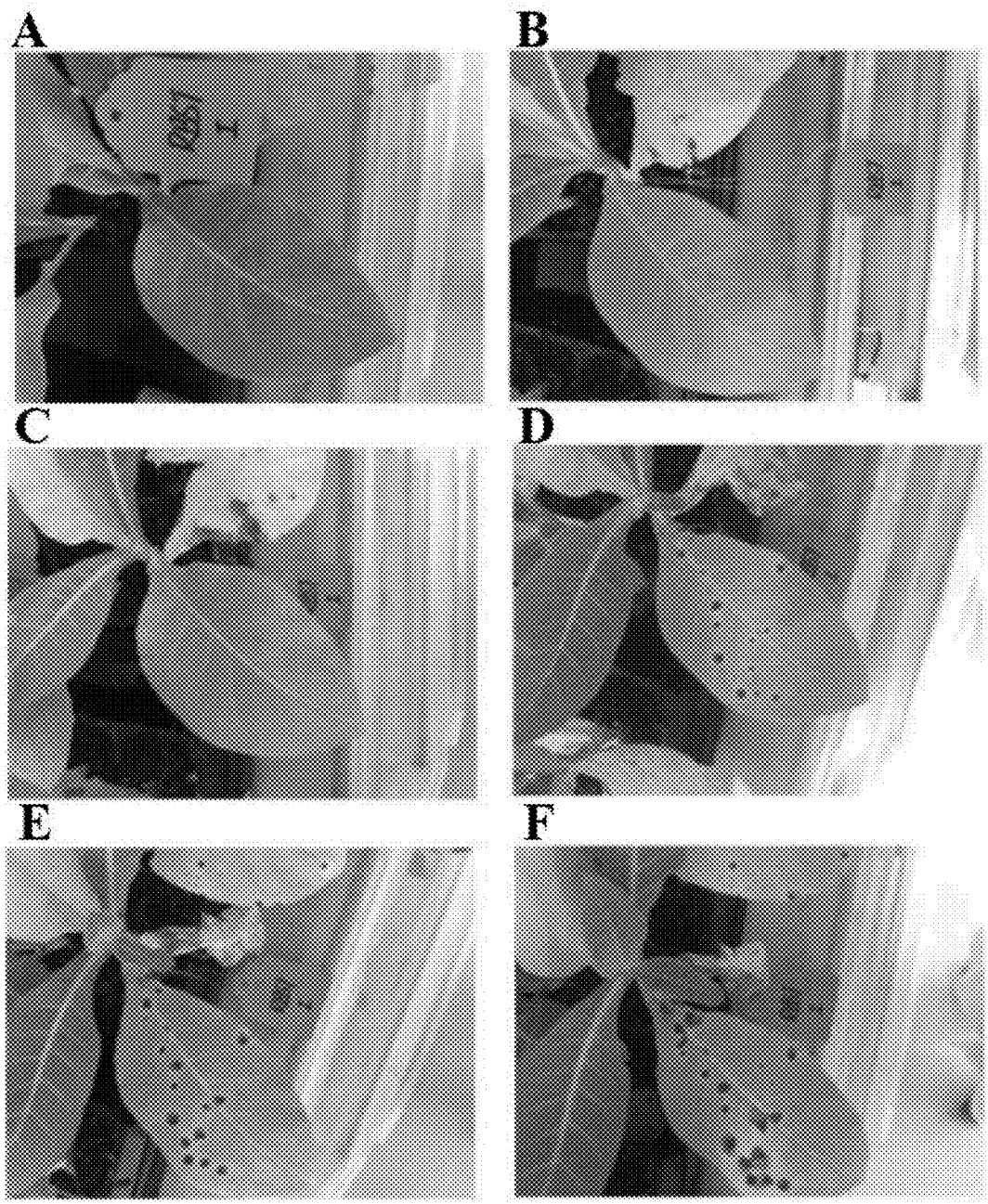
FIG. 6 shows the process of disease occurrence and development after the disease is induced. Photos A, B, C, D, E, and F are the symptom diagrams of the leaves recorded at 3 days intervals after inoculation.

After the forcedly ripened seedling leaves were inoculated with the conidia of the pathogen, the early symptom was the formation of needlepoint spots with yellow halos on the bottom leaves of the susceptible varieties. The needlepoint spot gradually enlarged, and the leaves turned from green to yellow. Part of the leaf spots eventually joined together, and the leaves quickly turned yellow and wither. The black spots with water stains first appeared on the slightly upper leaves (the heart leaf as the 1st leaf bit, the lower 3rd-5th leaf bit), and then needlepoint spots with yellow haloes were formed. As the needlepoint spot gradually expanded, the leaves lost their green color and turned yellow. Finally, some of the dense lesions led to local leaf discoloration and yellowing. The younger, tender, and non-fully expanded leaves showed no obvious symptoms. The severity of disease showed significant variation for different maturity of these leaves (FIG. 6).

Figure 8:
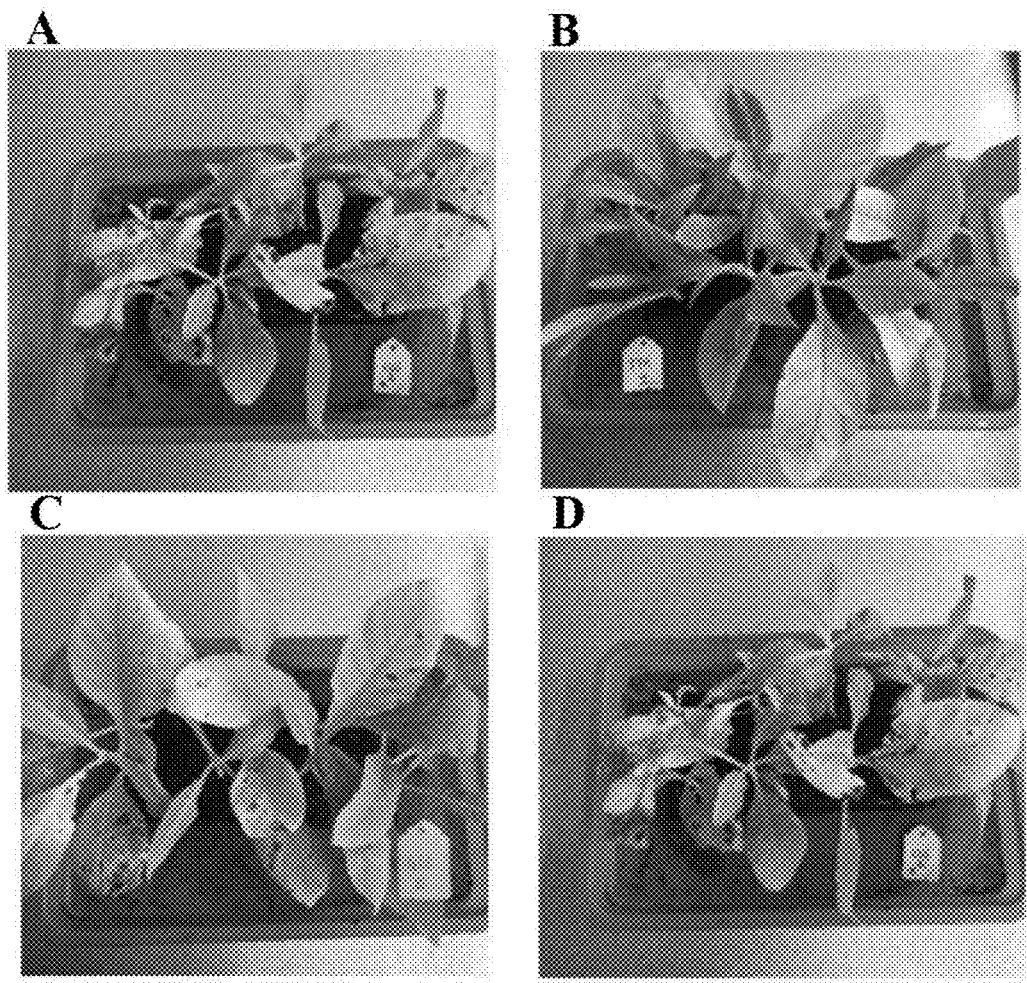
FIG. 8 shows a comparison of the disease symptoms of different resistant varieties. Photo A is a susceptible variety K326, photo B is a resistant variety Jingyehuang, photo C is a moderately resistant variety G28, and photo D is a moderately susceptible variety Honghua Dajinyuan.

As shown in FIG. 8, relatively smaller and fewer leaf spots developed on infected leaves of the disease-resistant varieties. However, relatively larger and more leaf spots developed on the susceptible varieties, and the areas surrounding the leaf spots were yellowing.

Figure 7:
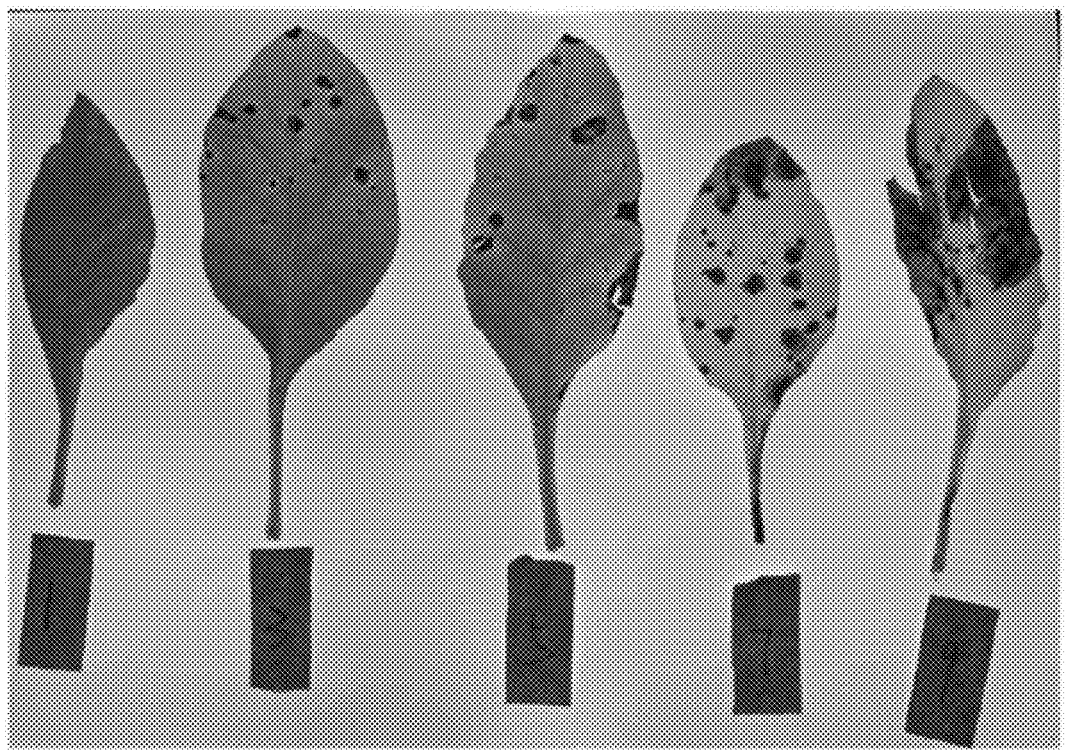
FIG. 7 is a schematic diagram of the severity levels of leaf disease verified by the plant leaf image analyzer; from left to right are levels 1, 3, 5, 7, and 9.

According to the tobacco disease grade and investigation standard, the number of disease leaves and their severity were recorded for 18 days after inoculation. To correct the error estimated by the naked eye, the severity of disease leaf (FIG. 7) were verified with a plant leaf image analyzer. When the disease was investigated, the disease severity was investigated and measured on leaf-by-leaf, the number of each severity leaves was recorded correspondingly and the disease index (as shown in Table 2) was calculated according to the formula.

Based on the indicators of resistance to disease in the national standards, 10 tobacco germplasms of disease resistance were evaluated as follows: the susceptible varieties were RBST, G140, K326, and Xiaoj in 1025; the moderately susceptible variety was Honghua Dajinyuan; the moderately resistant varieties were Gexin 3, KRK26, and G28; and the resistant varieties were Beinhart 1000-1 and Jingyehuang.

TABLE 2

Brown spot resistance values of the forcedly repening leaves of various tobacco varieties
Inoculation date: Nov. 15, 2019
Survey date: Dec. 6, 2019

| Tobacco varieties | Repetition | Severity level/ Number of leaves | | | | | | The leaf number | Disease index | Average value | Standard deviation |
|---|---|---|---|---|---|---|---|---|---|---|---|
| | | 0 | 1 | 3 | 5 | 7 | 9 | | | | |
| Beinhart 1000-1 | I | 7 | 9 | 3 | 3 | 1 | 1 | 24 | 22.69 | 22.56 | 2.14 |
| | II | 6 | 10 | 1 | 3 | 2 | 1 | 23 | 24.64 | | |
| | III | 8 | 9 | 3 | 2 | 1 | 1 | 24 | 20.37 | | |
| | Total | 21 | 28 | 7 | 8 | 4 | 3 | 71 | 22.54 | | |
| RBST | I | 0 | 2 | 3 | 3 | 4 | 12 | 24 | 75.00 | 77.43 | 2.84 |
| | II | 0 | 0 | 4 | 3 | 3 | 14 | 24 | 80.56 | | |
| | III | 0 | 1 | 3 | 3 | 3 | 11 | 21 | 76.72 | | |
| | Total | 0 | 3 | 10 | 9 | 10 | 37 | 69 | 77.46 | | |
| G28 | I | 0 | 9 | 4 | 1 | 2 | 1 | 17 | 32.03 | 38.64 | 7.55 |
| | II | 0 | 7 | 10 | 5 | 0 | 2 | 24 | 37.04 | | |
| | III | 0 | 6 | 7 | 3 | 4 | 3 | 23 | 46.86 | | |
| | Total | 0 | 22 | 21 | 9 | 6 | 6 | 64 | 39.24 | | |
| G140 | I | 0 | 2 | 3 | 3 | 3 | 13 | 24 | 75.93 | 79.40 | 3.87 |
| | II | 0 | 1 | 1 | 3 | 4 | 14 | 23 | 83.57 | | |
| | III | 0 | 0 | 5 | 2 | 4 | 13 | 24 | 78.70 | | |
| | Total | 0 | 3 | 9 | 8 | 11 | 40 | 71 | 79.34 | | |
| K326 | I | 0 | 0 | 3 | 4 | 2 | 12 | 21 | 79.89 | 83.11 | 3.11 |
| | II | 0 | 0 | 1 | 5 | 5 | 13 | 24 | 83.33 | | |
| | III | 0 | 1 | 2 | 1 | 3 | 17 | 24 | 86.11 | | |
| | Total | 0 | 1 | 6 | 10 | 10 | 42 | 69 | 83.25 | | |
| Xiaohuangjin | I | 0 | 7 | 5 | 1 | 3 | 7 | 23 | 53.62 | 56.06 | 5.08 |
| | II | 0 | 3 | 5 | 4 | 1 | 8 | 21 | 61.90 | | |
| | III | 0 | 8 | 3 | 3 | 2 | 7 | 23 | 52.66 | | |
| | Total | 0 | 18 | 13 | 8 | 6 | 22 | 67 | 55.89 | | |
| Xiaohuangjin 1025 | I | 0 | 0 | 5 | 1 | 3 | 15 | 24 | 81.48 | 81.51 | 1.81 |
| | II | 0 | 3 | 0 | 2 | 5 | 13 | 23 | 79.71 | | |
| | III | 0 | 0 | 1 | 7 | 1 | 15 | 24 | 83.33 | | |
| | Total | 0 | 3 | 6 | 10 | 9 | 43 | 71 | 81.53 | | |
| Gexin No. 3 | I | 4 | 3 | 4 | 3 | 4 | 5 | 23 | 49.76 | 47.02 | 3.22 |
| | II | 5 | 4 | 2 | 5 | 4 | 3 | 23 | 43.48 | | |
| | III | 4 | 4 | 3 | 4 | 3 | 5 | 23 | 47.83 | | |
| | Total | 13 | 11 | 9 | 12 | 11 | 13 | 56 | 57.94 | | |
| KRK26 | I | 3 | 9 | 6 | 0 | 1 | 4 | 23 | 33.82 | 41.45 | 6.97 |
| | II | 5 | 4 | 4 | 5 | 1 | 5 | 24 | 43.06 | | |
| | III | 2 | 6 | 2 | 5 | 3 | 4 | 22 | 47.47 | | |
| | Total | 10 | 19 | 12 | 10 | 5 | 13 | 69 | 41.38 | | |
| Jingyehuang | I | 0 | 20 | 3 | 0 | 1 | 0 | 24 | 16.67 | 16.99 | 2.67 |
| | II | 0 | 18 | 3 | 1 | 0 | 1 | 23 | 14.49 | | |
| | III | 3 | 16 | 3 | 1 | 0 | 0 | 23 | 14.49 | | |
| | Total | 3 | 54 | 9 | 2 | 1 | 1 | 70 | 16.98 | | |

TABLE 3

Brown spot resistance values of tobacco varieties in the field.

| Tobacco varieties | Repetition (Disease index) | | | Average value | Standard deviation |
|---|---|---|---|---|---|
| | 2017 | 2018 | 2019 | | |
| Beinhart 1000-1 | 24.86 | 19.70 | 20.05 | 21.54 | 2.88 |
| Xiaohuangjin1025 | 89.25 | 88.19 | 82.22 | 86.55 | 3.79 |
| Jingyehuang | 13.39 | 15.03 | 18.47 | 15.63 | 2.59 |
| G140 | 77.18 | 84.56 | 80.96 | 80.90 | 3.69 |
| KRK26 | 41.41 | 48.75 | 36.30 | 42.15 | 6.26 |
| RBST | 87.04 | 77.78 | 80.15 | 81.66 | 4.81 |
| Gexin No. 3 | 44.03 | 48.42 | 38.79 | 43.75 | 4.82 |
| Honghua Dajinyuan | 60.54 | 53.28 | 76.12 | 63.31 | 11.67 |
| G25 | 47.40 | 43.24 | 40.96 | 43.87 | 3.27 |
| K326 | 70.34 | 75.68 | 79.21 | 75.08 | 4.47 |

Comparing the data obtained for the evaluation of brown spot resistance by forcedly ripened leaves with the data in the field (as shown in Table 3), the ripened leave results were consistent with the field in the resistance or susceptibility trends. Based on these data, it is concluded that the evaluation results of ripened leaves at the seedling stage were reliable, and the results of the 3 batches were relatively stable. In conclusion, the technique for detecting disease resistance of ripened leaves at the seedling stage of the disclosure can be used for the large-scale screening of tobacco varieties for resistance to brown spot.

It would be obvious to those skilled in the arts that changes and modifications may be made; therefore, the aim of the appended claims is to cover all such changes and modifications.

What is claimed is:

1. A method of identifying a tobacco variety's resistance to Alternaria alternata (brown spot disease) that is able to infect tobacco, comprising:
   (1) nursing seedlings of a tobacco variety under a plastic film, transplanting the seedlings into a tray and then accelerating maturing of leaves of the seedlings while cultivating the seedlings in the tray, wherein transplanting the seedlings into a tray and then accelerating maturing of the leaves of the seedlings while cultivating the seedlings in the tray comprises:
   transplanting the seedlings into a tray disposed in a pool, wherein the pool comprises 0.3%-0.5% potassium sulfate solution or 0.3%-0.5% potassium dihydrogen phosphate solution, and the 0.3%-0.5% potassium sulfate solution or the 0.3%-0.5% potassium dihydrogen phosphate solution in the pool has a depth that is ⅓ the height of the tray;
   covering the seedlings with a row cover and cultivating the seedlings under the row cover; and
   seven days later, spraying 0.3%-0.5% potassium sulfate solution or 0.3%-0.5% potassium dihydrogen phosphate solution on the leaves of the seedlings and continuing cultivating the seedlings under the row cover until the seedlings each have 3-5 mature leaves, and then eliminating sick and weak seedlings and removing overmature leaves and leaves with lesions from the seedlings, wherein the mature leaves have a smaller size than that of tobacco leaves not cultivated by a leaf maturing acceleration process;
   (2) inoculating conidia suspension of Alternaria alternata (A. alternata) on the mature leaves by spraying, thereby forming an artificial disease nursery in which A. alternata conidia are evenly distributed on foliage of the seedlings, wherein a concentration of the conidium suspension of A. alternata is $10^4$ cfu/mL;
   (3) simulating a hospitable environment to induce brown spot disease, where the conidia of A. alternata germinate to infect the foliage of the seedlings and the seedlings present symptoms; and
   (4) investigating the brown spot disease on the seedlings for 14-21 days after inoculation; selecting multiple leaves to observe a spreading process of leaf spots; evaluating brown spot resistance of the seedlings, evaluating the tobacco variety's disease index (DI) in line with the indicators defined in a Chinese national standard for resistance identification of brown spot, and defining the tobacco variety as immune or highly resistant variety, resistant variety, or moderately resistant variety to A. alternata based on the Chinese national standard.

2. The method of claim 1, wherein the characteristic features of the mature leaves are as follows: the seedlings have light green leaves with white main veins, and the leaves feel sticky by touching, and a soil plant analysis development (SPAD) value for chlorophyll assessment is 25-35.

3. The method of claim 1, wherein in (2), the conidium suspension of A. alternata is obtained by diluting conidium mother liquor of A. alternata; and the diluent is an aqueous solution comprising 1.00%-2.00% glucose or sucrose, 1.00%-2.00% glycerin, and 0.25%-0.50% Tween 80.

4. The method of claim 1, wherein in (3), simulating a hospitable environment to induce brown spot disease comprises a pathogen infection stage and a disease development period:
   during the pathogen infection stage, cultivating the seedlings in an artificial climate chamber moisturizing box, where the suitable environment is weak light, appropriate temperature, and ultrasonic water atomization moisturizing for 3-5 days; and
   during the disease development period, allowing the disease spots to expand on the leaf surface after the ultrasonic water atomization moisturizing moisturizes the leaves for 3-5 days; simulating dew and guttation by atomizing water with ultrasonic humidifier or by micro-spraying regularly at dawn and in the evening until spraying water on the foliage forms water drops which do not drip off the foliage, and completing moisturization when investigating the disease for 14-21 days after inoculation.

5. The method of claim 4, wherein at the pathogen infection stage, the relative humidity is above 85%, and the temperature during the disease development period is 20-35° C.

6. The method of claim 1, wherein (4) further comprises dividing resistance to A. alternata into 5 levels according to the disease index range as follows: 0 is highly resistant or immune, 0.1-25.0 is resistant, 25.1-50.0 is moderately resistant, 50.1-75.0 is moderately susceptible, and 75.1-100.0 is susceptible.

* * * * *